(12) United States Patent
Birdwell

(10) Patent No.: US 7,063,580 B1
(45) Date of Patent: Jun. 20, 2006

(54) SHIP EMPLOYING A BUOYANT PROPULSION SYSTEM

(76) Inventor: Larry D. Birdwell, 5604 NE. St. Johns Rd., Vancouver, WA (US) 98661

( * ) Notice: Subject to any disclaimer, the term of this patent is extended or adjusted under 35 U.S.C. 154(b) by 0 days.

(21) Appl. No.: 11/126,106

(22) Filed: May 9, 2005

(51) Int. Cl.
*B63H 19/08* (2006.01)

(52) U.S. Cl. ............... 440/12.56; 440/12.63; 440/12.64

(58) Field of Classification Search ............ 440/12.56, 440/12.63, 12.64
See application file for complete search history.

(56) References Cited

U.S. PATENT DOCUMENTS

| | | | |
|---|---|---|---|
| 739,775 A * | 9/1903 | Bayard | ............ 440/12.56 |
| 1,913,605 A | 6/1933 | Martin | |
| 2,377,143 A | 5/1945 | Golden | |
| 3,082,047 A * | 3/1963 | Bernotas | ............ 384/568 |
| 3,205,852 A | 9/1965 | Shepard | |
| 3,976,025 A | 8/1976 | Russell | |
| 4,433,634 A | 2/1984 | Coast | |
| 4,715,668 A | 12/1987 | Burmeister | |
| 5,511,508 A | 4/1996 | Wilson, Sr. et al. | |
| 5,845,593 A | 12/1998 | Birkestrand | |
| 5,845,595 A * | 12/1998 | Atkinson | ............ 440/12.56 |
| 6,482,053 B1 * | 11/2002 | Prestenbach | ............ 440/12.63 |
| 6,508,188 B1 | 1/2003 | Dong et al. | |
| 6,582,258 B1 | 6/2003 | Morin | |
| 6,755,701 B1 | 6/2004 | Dornier, II et al. | |
| 6,866,108 B1 | 3/2005 | Borgwarth et al. | |

\* cited by examiner

*Primary Examiner*—Stephen Avila
(74) *Attorney, Agent, or Firm*—Birdwell & Janke, LLP

(57) ABSTRACT

A ship employing a buoyant propulsion system. A preferred such ship comprises a superstructure, a backbone, and a sub-structure. The backbone supports the superstructure. The sub-structure depends from the backbone and adapted to float the backbone and the superstructure above liquid water. The sub-structure includes one or more buoyant propulsion units. Each buoyant propulsion unit comprises an endless track having a plurality of associated paddle members and is adapted for elongate rotary motion of at least portions of the associated paddle members through the water. Each buoyant propulsion unit further comprises a race-roller-bearing assembly for transmitting load imposed by the superstructure to the track. Preferably, the one or more buoyant propulsion units are adapted to float the backbone and the superstructure substantially above the water.

28 Claims, 3 Drawing Sheets

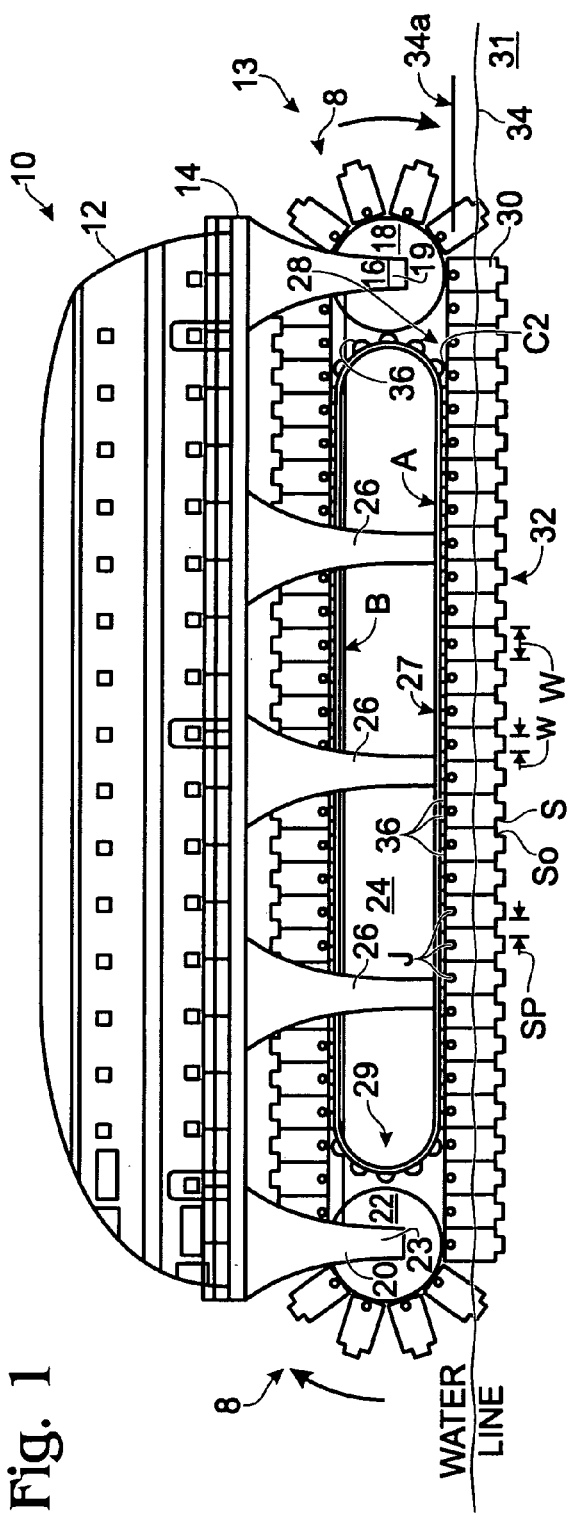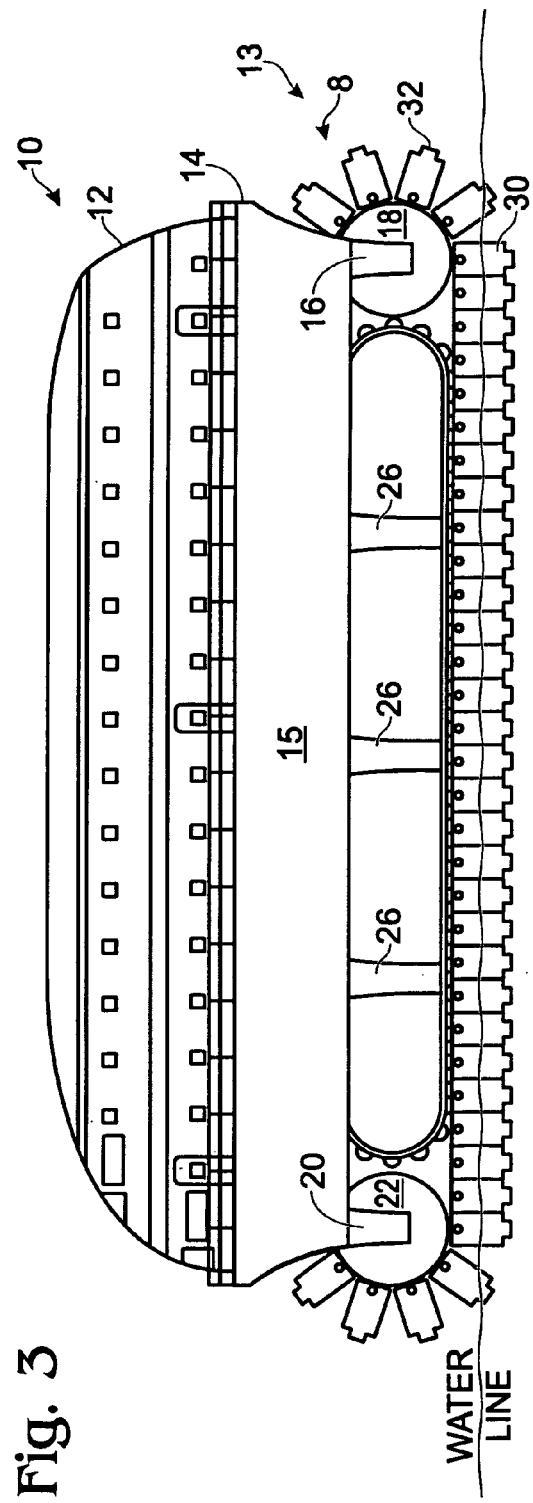

SHIP EMPLOYING A BUOYANT PROPULSION SYSTEM

FIELD OF THE INVENTION

The present invention relates to water-going surface and amphibious vessels or ships having a propulsion system that also provides buoyancy.

BACKGROUND

Amphibious vessels or ships (hereinafter "ships") for traveling over the surface of a body of water or over terrain which approximates a fluid such as muddy earth or wet sand, must provide for both flotation and propulsion. While many different techniques have been used throughout history to provide propulsion in ships, flotation has typically been provided in only one way. That is, according to Archimedes' principle, a ship (or any other floating object) must displace an amount of water that equals or exceeds its own weight. Fresh water weighs about 62.5 pounds per cubic foot, and a significant portion of the ship must typically be submerged to provide the required flotation.

The propulsion system employed in a ship must overcome forces that resist the ship's movement over the water. Both the air, acting against the portion of the ship above the water-line (hereinafter "super-structure"), and the water, acting against the portion of the ship submerged below the water-line (hereinafter "hull") resist movement of the ship; however, the contribution of the water is by the far the most significant.

The water resists movement of the hull through the water for two reasons. First, water is viscous as a result of its molecules being somewhat attracted to one another. This viscosity results in a frictional force that resists shearing of the water. This frictional force increases in proportion to the velocity or speed of the ship.

A second form of resistance to movement of the hull through water results from the fact that the water has inertia, and so resists accelerations. Displacing a given volume of water requires accelerating the volume of water sufficiently quickly that the water can be moved out of the way of the ship. Producing this acceleration requires a force.

The propulsion system must provide sufficient propulsive force that both of these reactive forces applied to the hull by the water are overcome. As the ship travels faster, both of these reactive forces increase, and the speed of most ships is severely limited as a result of the mechanical requirements on the propulsion system, as well as the requirement to supply the propulsion system with sufficient fuel, to overcome these forces. Further, there is a theoretical maximum speed determined for a ship employing a displacement hull, i.e., a hull that remains submerged to the same extent regardless of ship speed, that is proportional to the square root of the length of the hull.

The fact that the water reacts against the submerged hull and thereby limits the speed of a ship has led to the use of the planing hull or hydrofoil which lifts out of the water as ship speed is increased. An extreme case of minimizing the ship's interaction with the water is found in the hovercraft, where no part of the ship is submerged, so that there is in essence no hull. However, both hydrofoils and hovercraft have high fuel requirements and find limited use. They are not generally practical for use in large ships requiring a high carrying capacity.

There is a need in the military to employ large ships that can carry troops and equipment to remote parts of the globe with the utmost speed. It is also more generally desirable to improve ship efficiency by maximizing speed and minimizing fuel requirements. Accordingly, there is a need for a ship employing a buoyant propulsion system as described herein.

SUMMARY

A ship employing a buoyant propulsion system is disclosed herein. A preferred such ship comprises a superstructure, a backbone, and a sub-structure. The backbone supports the superstructure. The sub-structure depends from the backbone and adapted to float the backbone and the superstructure above liquid water. The sub-structure includes one or more buoyant propulsion units. Each buoyant propulsion unit comprises an endless track having a plurality of associated paddle members and is adapted for elongate rotary motion of at least portions of the associated paddle members through the water. Each buoyant propulsion unit further comprises a race-roller-bearing assembly for transmitting load imposed by the superstructure to the track. Preferably, the one or more buoyant propulsion units are adapted to float the backbone and the superstructure substantially above the water.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DESCRIPTION OF THE DRAWINGS

FIG. 1 is a side elevation of a preferred embodiment of a ship having a buoyant propulsion system according to the present invention.

FIG. 3 is a front elevation of the ship of FIG. 1.

DETAILED DESCRIPTION OF PREFERRED EMBODIMENTS

The present inventors have recognized that the structure required to keep a ship afloat, i.e., its hull, is also the major obstacle to efficiently moving the ship through the water. In response to this recognition, they have arrived at a buoyant propulsion system. The buoyant propulsion system is preferably employed for use in a water-going surface ship, and is also highly suited for adapting the ship to function amphibiously. However, it should also be understood that propulsion systems according to the present invention may be utilized in vehicles that only travel over hard ground, and will provide similar advantages to those provided for a water-going ship or amphibious vehicle when utilized over ground that is soft or fluid-like. A preferred embodiment of the invention is described herein in the context of a water-going surface ship, but it should be understood that the same principles can be applied generally to transports operating over or through mediums other than water.

Figure 2:
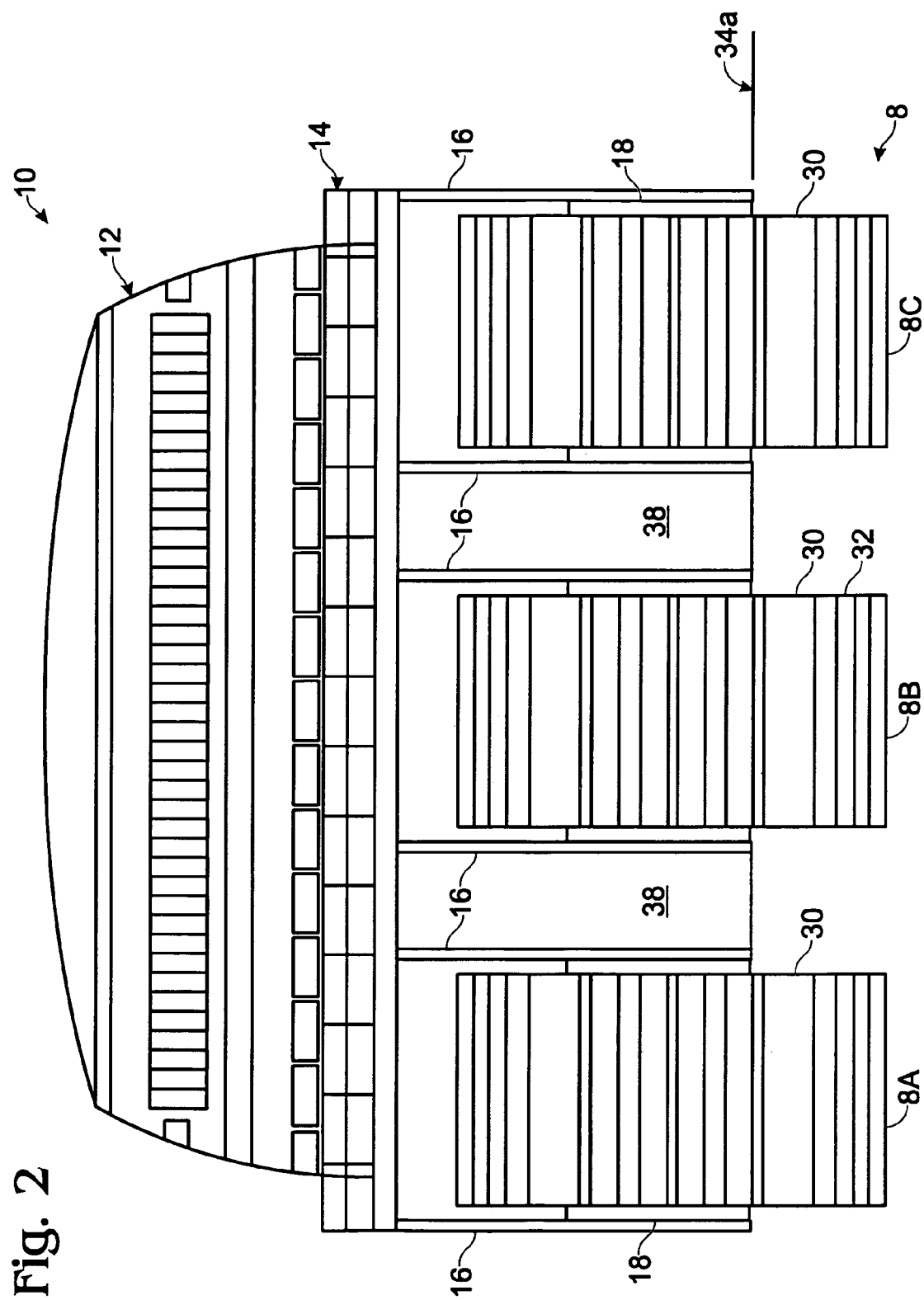
FIG. 2 is a side elevation of the ship of FIG. 1 showing side panels.

Referring now to FIGS. 1 and 2, a large, personnel or cargo-carrying ship 10 which is particularly adapted for, e.g., military use has a superstructure 12, a primary load bearing platform or deck ("backbone") 14 for supporting the superstructure, and a sub-structure 13 for supporting the superstructure and backbone above the water as well as providing propulsion for the ship.

The superstructure 12 comprises control rooms, ship facilities such as radio and radar, quarters for personnel, cargo holds. The deck 14 may includes installations such as winches, guns, missile launchers, depth charge racks, lifeboat davits, rails, and other machinery or installations such as are useful for the particular applications for which the ship is used.

The sub-structure 13 comprises buoyant propulsion units 8. While shown with three of the propulsion units 8 (8A, 8B, and 8C of FIG. 2), it should be understood that the ship 10 may employ any number of the propulsion units, including just one; however, three or more are considered preferable to optimize balance when traveling in a straight line.

The sub-structure 13 also includes a support portion 24, where the load of the superstructure 12 is transmitted by the deck 14 through one or more weight transfer beams 26 to the support structure 24 and ultimately to the propulsion units 8 as will be described in more detail below.

Each propulsion unit 8 comprises a flexible endless belt or track 28, the track being provided with a plurality of flotation paddles 30 pivotally (at pivot joints "J") depending from the track. The track is rotated about spaced apart rollers or "turnarounds" 18 and 22 to circulate the track through water 31 defining a water level (or "water line") 34. This circulation of the track translates each paddle 30 through the water, around a first one of the turnarounds, through the air, and thence around a second one of the turnarounds for returning the paddle back into the water.

Space underneath the superstructure 12 through which the paddles 30 are translated in the air is preferably covered with paneling 15 disposed all around, to provide protection for the tracks 28 and to minimize air resistance, as indicated in FIG. 3.

The turnarounds 18 and 22 of a single one of the propulsion units 8 rotate about respective axles 19 and 23, supported by respective turnaround support members 16 and 20 depending from the superstructure 12. At least one of the turnarounds is driven by a suitable power source (not shown) such as a diesel engine, electric motor, or combination thereof. Additional structures similar to the turnarounds 18 and 22 may be provided between the turnarounds to function as idler wheels.

As seen in side elevation (as in FIG. 1), the flexible track 28 adopts a substantially linear configuration between the turnarounds 18 and 22 and a circular configuration where it follows the cylindrically shaped turnarounds. These configurations together form what is referred to herein as an "elongate rotary" configuration. In the linear portion of the elongate rotary configuration of the track, the paddles 30 are in parallel alignment abutted against one another, whereas in the circular portion of the elongate rotary configuration, as will be readily appreciated, the paddles must be able to spread apart from one another at their distal ends as shown in FIG. 1.

Each of the paddles 30 includes a paddling projection 32 at its distal end. The projection 30 has a relatively narrow width "w" as compared to the width "W" of the paddle to provide a relieved "tread" surface "s" for pushing against the water as the track is rotated. For rotation in the direction indicated by the arrows, each tread surface "s" is disposed to push directly against a volume of water roughly defined by the area of the surface "s" multiplied by the spacing "sp" between it and an opposing surface "$s_o$" of the adjacent projection 32. Such volumes of water associated with each of the paddles 30 disposed in the water at any particular time provide the reactive force against which the force applied by the moving paddles 30 acts to propel the ship 10 relative to the water.

More particularly, these volumes possess mass determined by the density of water of about 62.5 pounds per cubic foot that, initially substantially at rest, is accelerated by the paddle 30 as the paddle begins to move through the water, to accelerate the ship. The viscosity of the water adds to the inertial reactive force as these volumes resist being moved relative to stationary water masses in proximity, and therefore adds to the "traction" provided by the paddles. Accordingly, rather than producing drag forces which slow or impede the progress of a ship through the water, the mass and viscosity of the water are utilized to advantage by the ship 10 to produce reactive forces necessary to accelerate the ship in the water. These reactive forces increase the greater the acceleration.

However, once the ship 10 has achieved a steady-state speed, its need for "traction" diminishes commensurate with the diminution of the reactive forces that provide it.

It is worthwhile to note that the flotation paddles move through the water in the opposite direction to that in which the ship is being propelled. On hard ground, the paddles would have no relative movement with respect to the ground, and the ship would travel at greatest efficiency. During acceleration in water, there will be relative motion between the paddles and the water despite the reactive forces, and therefore some loss of efficiency. However, once reaching a steady-state speed, the ship's interaction with the water will more closely approximate that which would occur on a hard surface. This provides the capability to move the ship at very high speeds, especially relative to a conventional ship with a fixed hull which experiences drag forces that increase with increasing speed.

The ship 10 may be moved forwardly or reversedly depending on the direction of the rotation of the tracks 28 of the propulsion units 8. In addition, preferably, the drive mechanisms for the propulsion units are such that the tracks can be driven independently, in different directions, for steering the ship. This can be accomplished using independent power sources for driving each track directly, or by using independent transmissions for driving each track that take power from the same power source. The ship may be steered by driving the two outer-most tracks, on either side of the ship, at different rates, and the ship may be rapidly turned by driving one track in one direction and the other track in the other direction. The use of the tracks in this manner reduces or eliminates the need for a rudder, although rudders, fins, wings or other steering and guiding devices could also be utilized.

It should be further understood that multiple tracks could be deployed in relative positions other than side-to-side. For example, two ships, each provided with one or more propulsion units 8, could be connected in a tandem manner through an articulated joint. Such an arrangement would allow for a high degree of maneuverability, such as would be useful in an amphibious landing craft. Furthermore, multiple ships could be conjoined to provide a seagoing platform.

The propulsion units 8 are preferably adapted to provide substantially all the buoyancy needed for the ship 10, thereby obviating the need for a separate hull to provide buoyancy. However, the propulsion units 8 need not provide all of this buoyancy, and may also provide a lesser amount for "floating" the ship in semi-aquatic environments such as marsh, mud, and wet sand. It should also be understood that other portions of the ship, such as a keel or ballasting system, could lie below the water surface and therefore assist flotation of the ship without departing from the principles of the invention. For example, in heavy weather it might be advantageous to operation to be able to lower stabilizers such as centerboards, sideboards, weighting systems or other accessories into the water either when underway or stopped. Pontoon outriggers could be provided as well, for example to stabilize the ship at rest in waves.

More particularly, those portions of the paddles 30 that lie below the water level 34 at any one time preferably provide the needed buoyancy. In addition, the same paddles provide the needed propulsion and must be strong enough to withstand the reaction forces applied by the water in addition to supporting the entire weight of the ship 10. Furthermore, the propulsion units are also well suited to propel a vehicle or ship across solid ground where the buoyancy they provide is not required. For paddles used on land, the forces applied to the paddles will typically not be distributed evenly on the paddles, so that portions or localized areas of the paddles could be subjected to even higher forces.

Figure 4:
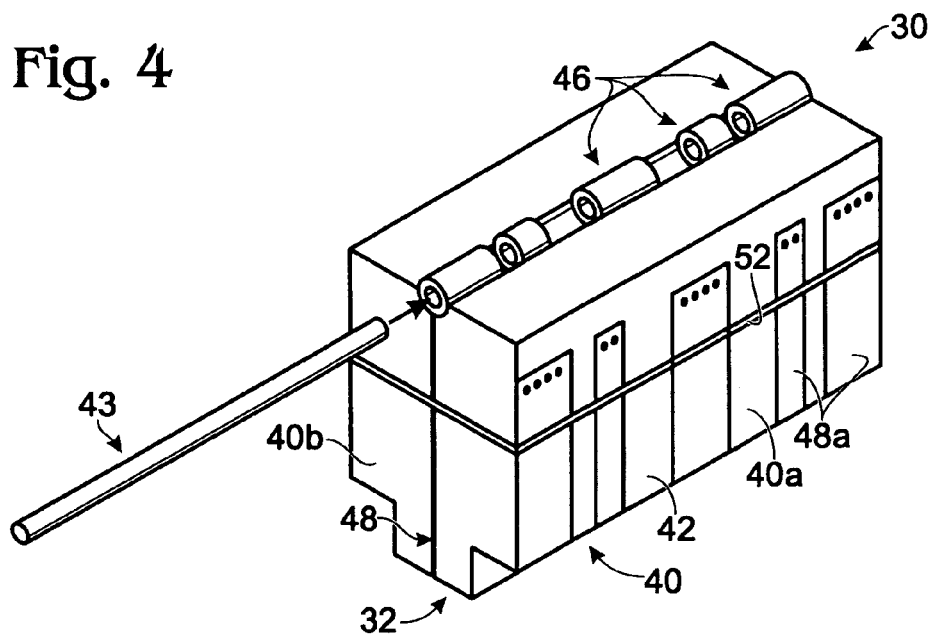
FIG. 4 is a pictorial view of a flotation paddle according to the present invention.

Referring to FIG. 4, a preferred embodiment of a paddle member 30 according to the present invention comprises a body portion 40, the paddling projection 32, and a hinge mechanism 46, preferably formed of metal, that, along with a pin 43 and a similar mechanism affixed to the track 28, provides the aforedescribed hinge joint "J." To provide both flotation and strength, the body portion 40 may be constructed in a number of different ways. For example, the paddles may be provided in a hollow form with a hard, e.g., metal, outer case and may be evacuated, or filled with a low density fluid, or a plastic foam, cellular or other filler material to provide buoyancy to the ship. Alternatively, the paddle members 30 provide no flotation, the flotation being provided by separate flotation members attached to and moving with the track.

However, preferably the flotation paddle is formed in exposed half-portions 40a and 40b formed of a foamed plastic material such as, preferably, polyurethane. A plurality of flexible straps 48, preferably formed of thin metal or plastic, is used as reinforcement members for both reinforcing and strapping the half-portions together to form a whole. With additional reference to FIG. 5, the straps 48 are secured around the hinge 46 and extend downwardly between the half-portions 40a and 40b, and are then brought back up along outside surfaces 42 of the half-portions. In FIG. 6, a strap 48a is shown extending up along the outside surface 42a of the half-portion 40a, and a strap 48b is shown extending up alongside the corresponding surface 42b of the half-portion 40b. The straps are caused to conform tightly to the surfaces 42 by being tied together with bolts 46 acting on the straps through plates 44, which are preferably formed of metal. The body portion 40 is preferably further wrapped in a perpendicular orientation with another strap 52. It will be readily appreciated that the body 40 may be divided into additional portions if desired, and that the number and the precise positioning of the straps 48 will depend on need.

Figure 5:
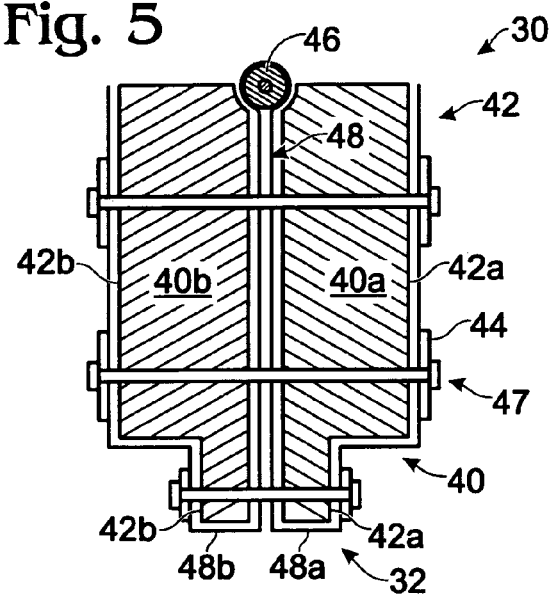
FIG. 5 is a side cross-section of the paddle of FIG. 4.
Figure 6:
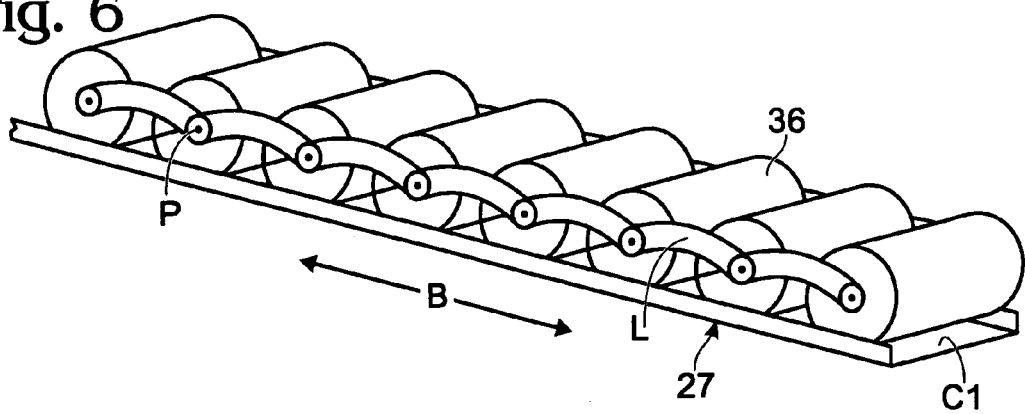
FIG. 6 is a pictorial view of a race for supporting the ship of FIG. 1 according to the present invention.

While the preferred paddling projection 32 as shown in FIG. 5 is of the form of a rectangular prism, the paddling projection may take other shapes without departing from the principles of the invention. Further, the bottom of the projection 32 may be provided with a tread to enhance the ability of the flotation paddle 30 to gain traction on traveling surfaces other than water, such as mud, soil, or rock. This feature would be favored for use when the ship 10 is adapted for amphibious operation, traveling over the water and up onto a beach, mudflat or docking pad.

As best seen in FIG. 2, preferably, the superstructure 12 includes at least one below-deck housing portion extending between two propulsion units. The housing portions 38 may be used to house heavy objects such as the ship's engines in order to keep the ship's center of mass relatively low to the water for stability against tipping or rolling, and they also provide a means of ingress to and egress from the ship 10. The below-deck housing portions 38 are suspended from the main deck 14, and thus their weight is also transmitted through the weight transfer beams 26 to the support portion 24. The housing portions 38 preferably extend the entire length of the ship, and are closed off from the external environment by means of inner walls (not shown). The housing portions may extend through the regions inside the elongate rotary path of the track 28 that also contains at least part of the support portions 24, preferably forming an integrated unit comprising the housing portions 36 and the support portion 24, within which power-generating engines and associated machinery, fuel tanks, drinking water reservoirs, batteries, and the like are disposed, and which may further be adapted to contain cargo and additional ballast if needed. Preferably the control devices and quarters for personnel are disposed above deck within the superstructure 12, but these features can also be contained within the housing portions 38, and the superstructure 12 could be eliminated.

Preferably, an unloaded ship of the preferred embodiment according to the present invention floats in the water such that water line 34 is disposed substantially as indicated in FIG. 1, about halfway up the vertical dimension of the paddles 30 disposed in the water. As the ship is loaded to capacity, the water line 34 rises with respect to the paddles, but at full loading the water line preferably does not rise high enough to reach the bottoms of the housing portions 38 (level 34a in FIG. 2), to minimize drag.

As mentioned above, the support portion 24 connects the propulsion units 8 to the superstructure 12 of the ship 10. The support portion includes a race 27 that has an elongate rotary configuration. Linear portions "A" and "B" of the race 27 follow the corresponding linear portions "A" and "B" of the track 28. Referring in addition to FIG. 6, the race 27 supports roller-bearings 36. The bearings may be attached to one another by links "L" through centrally disposed pivot points "P." Alternatively, the bearings may be unlinked to each other but confined within an embodiment of the race 27 which is adapted to retain the bearings therewithin. The race-roller-bearing assembly comprising race 27 and roller-bearings 36 is disposed between the track 28 and the support portion 24 over the respective linear portions "A" and "B," and the bearings are returned from one to the other linear portion by end portions 29 of the race 27. The bearings are preferably solid cylinders, but may be of other forms of construction providing a rolling function.

The roller-bearings 36 bear on an outer circumference C1 of the race 27 and inner surface C2 of the track 28 and translate relative to both. Particularly, as the track 28 moves relative to the race 27 along their respective linear portions "A" or "B," the roller-bearings rotate around the pivot points as the pivot points translate relative to the race 27 and the track 28 at one half the speed of translation of the track 28 relative to the ship 10. The decreased speed of translation of the bearings as opposed to bearings having their centers fixed with respect to either the support portion 24 or the propulsion units 8, as well as the fact that there is essentially no load on the links "L" or the pivot points "P," provide for a high degree of bearing strength and reliability for carrying heavy loads at high speeds. Indeed, the links and pivot points are unnecessary if the bearings are retained within the race 27. The fact that the links may be attached to the roller-bearings with relatively low strength attachments also provides that the joints can be easily adapted for easy removal of individual roller-bearings and individual links, should damage occur.

As is the case for the paddles 30, the spacing between the pivot points "P" will increase as the roller-bearings translate around circular shaped end portions 29. It may be possible to provide a satisfactory alternative travel path for the race 27 at its end portions, however, for circular shaped end portions the links "L" must be either flexible or at least extendable to accommodate changes in spacing. A structure analogous to a drawer slide may be used for this purpose. As the links carry essentially no load and as the roller-bearings also lose contact with the track 28 during such times, many different types of link structures could be used.

The size of the ship and accordingly the number and sizes of tracks and flotation paddles may vary over a wide range depending on the purpose to which the ship is to be put. Smaller ships are likely preferable for amphibious operations, such as landing craft for troops, whereas larger ships are likely preferable for operation primarily on large bodies of water. However it may be desirable for a larger ship to have amphibious capabilities, such as in the case of a ferry that can move up out of the water onto a landing pad whereupon passengers may embark and debark.

In one especially preferred embodiment, the total length of the ship is about 150 feet (45 meters). A preferred size of each flotation paddle 30 for a ship of that length is about 5 feet (1.5 meters) thick in the dimension of the track axis, and about 8 feet (2.5 meters) in height. Each preferred paddling projection 32 for this preferred embodiment is about 2.5 feet (0.7 meters) in the dimension of the track axis, about 1 foot (0.3 meters) in the vertical dimension, and have the same lateral length as the flotation paddle, or 18 feet (5.5 meters). The diameter of each turnaround 18 or 22 is about 16 feet (5 meters). The width of the tracks 28 with their flotation paddles 30 may vary over a wide range, consistent with the size of the ship. In the preferred embodiment of a ship about 150 feet (45 meters) in length referred to above, a preferred width is about 80 feet (24 meters), the ship of this size being driven by three buoyant propulsion units 8. In this preferred embodiment, each unit 8 comprises a track about 18 feet (5.5 meters) in width. Three such tracks are separated by two below-deck housing portions, each about 10 feet (3 meters) wide. Thus the two below-deck housing portions each have dimensions of about 10 feet (3 meters) in width by about 115 feet (35 meters) in length by about 24 feet (7.3 meters) in height, or about 27,600 cu. ft. (1000 cu. meters).

The total volume of each flotation paddle 30 with its paddling projection 32 of the dimensions of this preferred embodiment is 765 cu. ft. (21.4 cu. meters). With the preferred waterline for the unloaded ship being about halfway up each flotation paddle, the maximum theoretical displacement at this loading equals 405 cu. ft. (11.3 cu. meters) of water, equivalent to about 25,272 lbs (11,400 kg) or 12.6 tons (11.4 metric tons) per flotation paddle. Approximately 30 paddles would be disposed in the water at a given time in a ship of the size of this preferred embodiment, therefore a displacement of 378 tons (343 metric tons) per buoyant propulsion unit at the preferred unloaded waterline, or about 1130 tons (1030 metric tons) of buoyancy for the three propulsion units, would be provided. At a fully loaded waterline near the top of the flotation paddles disposed in the water, about 765 cu. ft. (21.4 cu. meters) per paddle would be equivalent to 47,810 lbs (21,400 kg) or 23.9 tons (21.4 metric tons). With 30 paddles in the water per propulsion unit and three propulsion units the total maximum theoretical buoyancy provided would be equal to 2150 tons (1925 metric tons). These theoretical maximum buoyancy values would be diminished to the extent that preferred foamed polymeric material used for construction of the flotation paddles, such as for example polyurethane, possesses a density greater than that of air. Nevertheless, the structural strength and rigidity that can be provided by using foamed polymeric materials such as polyurethane are advantageous and the resulting decrease in buoyancy is minimal, therefore such materials are the preferred materials of construction of the flotation paddles and paddling projections, at least for the interior portions thereof.

For ships of smaller overall dimensions the dimensions of each component is proportionally reduced, taking scaling factors into consideration. Thus, for example, an amphibious landing craft about a third the length of the above-described preferred embodiment would have a total length of about 50 feet (15 meters), width of 27 feet (8 meters) and a total buoyancy of between 377 tons (343 metric tons) unloaded and 717 tons (642 metric tons) fully loaded. This smaller preferred embodiment could be provided with three buoyant propulsion units 8 each about 6 feet (2 meters) in lateral length. Thus, although the preferred embodiment according to the invention is a ship of significant size, the principles of the present invention may be applied to smaller sized vessels.

Ships with displacement values in the ten of thousands of tons (metric tons) would be advantageous for use in applications as large aircraft carriers, floating platforms, or battleships. Ships with displacement values in the thousands of tons would be advantageous for use in applications such as destroyers, minesweepers, helicopter carriers, and vessels of comparable size. Ships with displacement values in the hundreds of tons or even less would be advantageous for use in applications such as landing craft and patrol boats. Preferably, the displacement of a ship equipped according to the present invention is at least ten tons (10,000 kg), for instance, suitable for a light craft useful for coastal patrolling or inland waters, although even smaller craft on the scale of personal watercraft could be provided.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow. It will doubtless be apparent that there are other embodiments employing these principles that are not described in detail herein.

The invention claimed is:

1. A ship comprising:
   a superstructure for supporting a plurality of personnel and equipment;
   a backbone for supporting said superstructure; and
   a sub-structure depending from said backbone and adapted to float said backbone and said superstructure above liquid water, said sub-structure including one or more buoyant propulsion units, each buoyant propulsion unit comprising an endless track having a plurality of associated paddle members and being adapted for elongate rotary motion of at least portions of the associated paddle members through the water, and a race-roller-bearing assembly for transmitting load imposed by said superstructure to said track.

2. The ship of claim 1, wherein said paddle members are pivotally connected to the associated track at proximal ends thereof.

3. The ship of claim 2, wherein said paddle members include associated paddling projections extending from distal ends thereof and forming respective paddling surfaces and associated relief volumes defined between the paddle members.

4. The ship of claim 3, wherein said paddling projections are rectangular prismatic in form.

5. The ship of claim 3, wherein said paddle members are formed substantially of a polymeric material.

6. The ship of claim 1, wherein said paddle members include associated paddling projections extending from distal ends thereof and forming respective paddling surfaces and associated relief volumes defined between the paddle members.

7. The ship of claim 6, wherein said paddling projections are rectangular prismatic in form.

8. The ship of claim 6, wherein said paddle members are formed substantially of a polymeric material.

9. The ship of claim 1, wherein said one or more buoyant propulsion units are adapted to float said backbone and said superstructure substantially above the water.

10. The ship of claim 9, wherein said paddle members are pivotally connected to the associated track at proximal ends thereof.

11. The ship of claim 10, wherein said paddle members include associated paddling projections extending from distal ends thereof and forming respective paddling surfaces and associated relief volumes defined between the paddle members.

12. The ship of claim 11, wherein said paddling projections are rectangular prismatic in form.

13. The ship of claim 1, wherein said paddle members are formed substantially of a polymeric material.

14. The ship of claim 9, wherein said paddle members include associated paddling projections extending from distal ends thereof and forming respective paddling surfaces and associated relief volumes defined between the paddle members.

15. The ship of claim 14, wherein said paddling projections are rectangular prismatic in form.

16. The ship of claim 14, wherein said paddle members are formed substantially of a polymeric material.

17. The ship of claim 1, comprising at least two of said buoyant propulsion units.

18. The ship of claim 17, wherein said paddle members are pivotally connected to the associated track at proximal ends thereof.

19. The ship of claim 18, wherein said paddling projections are rectangular prismatic in form.

20. The ship of claim 17, wherein said one or more buoyant propulsion units are adapted to float said backbone and said superstructure substantially above the water.

21. The ship of claim 20, wherein said paddle members are pivotally connected to the associated track at proximal ends thereof.

22. The ship of claim 21, wherein said paddling projections are rectangular prismatic in form.

23. The ship of claim 1, comprising at least three of said buoyant propulsion units.

24. The ship of claim 23, wherein said paddle members are pivotally connected to the associated track at proximal ends thereof.

25. The ship of claim 24, wherein said paddling projections are rectangular prismatic in form.

26. The ship of claim 23, wherein said one or more buoyant propulsion units are adapted to float said backbone and said superstructure substantially above the water.

27. The ship of claim 26, wherein said paddle members are pivotally connected to the associated track at proximal ends thereof.

28. The ship of claim 27, wherein said paddling projections are rectangular prismatic in form.

* * * * *